US010246039B2

(12) United States Patent
Sumiya

(10) Patent No.: US 10,246,039 B2
(45) Date of Patent: Apr. 2, 2019

(54) AIRBAG DEVICE

(71) Applicant: Tomohiro Sumiya, Yokohama (JP)

(72) Inventor: Tomohiro Sumiya, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 71 days.

(21) Appl. No.: 15/303,273

(22) PCT Filed: Jan. 6, 2015

(86) PCT No.: PCT/JP2015/050168
§ 371 (c)(1),
(2) Date: Oct. 11, 2016

(87) PCT Pub. No.: WO2015/162943
PCT Pub. Date: Oct. 29, 2015

(65) Prior Publication Data
US 2017/0028954 A1 Feb. 2, 2017

(30) Foreign Application Priority Data

Apr. 25, 2014 (JP) .................................. 2014-090942

(51) Int. Cl.
*B60R 21/233* (2006.01)
*B60R 21/205* (2011.01)
(Continued)

(52) U.S. Cl.
CPC .......... *B60R 21/205* (2013.01); *B60R 21/231* (2013.01); *B60R 21/233* (2013.01); *B60R 21/237* (2013.01); *B60R 2021/23107* (2013.01)

(58) Field of Classification Search
CPC ... B60R 21/205; B60R 21/231; B60R 21/233; B60R 21/237
See application file for complete search history.

(56) References Cited

U.S. PATENT DOCUMENTS 4,262,931 A 4/1981 Strasser et al.
5,609,363 A * 3/1997 Finelli ................... B60R 21/231
280/730.1
(Continued)

FOREIGN PATENT DOCUMENTS

CA 1 160 657 1/1984
CA 2 584 099 10/2007
(Continued)

OTHER PUBLICATIONS

Yoshida et al., Air Bag Device, Oct. 10, 2000, JPO, JP 2000-280845 A, Machine Translation of Description (Year: 2000).*
(Continued)

*Primary Examiner* — James A English
(74) *Attorney, Agent, or Firm* — Brinks Gilson & Lione

(57) ABSTRACT

An airbag device 100 restrains an occupant of a front passenger seat 104 from a front side of the vehicle. The airbag device 100 includes a housing 120 having an opening 132, and a cushion 108 including a main bag 112 inflated and deployed from the housing 120 toward a front side of the front passenger seat 104 and a support bag 114 inflated and deployed from the housing 120 toward a rear side of a center console 116. The main bag 112 and the support bag 114 each have a bag shape and are reduced in size and stored in the housing 120 in a stored form 130 such that the support bag 114 is placed on the main bag 112 on the side of the opening 132.

18 Claims, 7 Drawing Sheets

(a)

(b)

(51) Int. Cl.
*B60R 21/237* (2006.01)
*B60R 21/231* (2011.01)

(56) References Cited

U.S. PATENT DOCUMENTS

| | | | |
|---|---|---|---|
| 6,113,136 A * | 9/2000 | Hamada | B60R 21/2035 |
| | | | 280/728.2 |
| 7,152,880 B1 | 12/2006 | Pang et al. | |
| 8,407,968 B2 * | 4/2013 | Lachat | B60R 21/201 |
| | | | 280/743.1 |
| 8,882,138 B1 | 11/2014 | Hicken et al. | |
| 9,272,684 B1 * | 3/2016 | Keyser | B60R 21/237 |
| 9,555,762 B2 * | 1/2017 | Umehara | B60R 21/233 |
| 9,738,243 B2 * | 8/2017 | Fukawatase | B60R 21/233 |
| 2002/0135164 A1 | 9/2002 | Thomas | |
| 2003/0115945 A1 | 6/2003 | Tsujita | |
| 2003/0218325 A1 | 11/2003 | Hasebe et al. | |
| 2004/0051285 A1 | 3/2004 | Fischer | |
| 2004/0160048 A1 * | 8/2004 | Hasebe | B60R 21/233 |
| | | | 280/743.1 |
| 2005/0029779 A1 | 2/2005 | Bito et al. | |
| 2005/0184489 A1 * | 8/2005 | Kobayashi | B60R 21/231 |
| | | | 280/729 |
| 2005/0230945 A1 | 10/2005 | Watanabe | |
| 2006/0006633 A1 * | 1/2006 | Bito | B60R 21/233 |
| | | | 280/740 |
| 2006/0113774 A1 * | 6/2006 | Hirose | B60R 21/233 |
| | | | 280/731 |
| 2006/0186656 A1 | 8/2006 | Kumagai | |
| 2008/0284140 A1 * | 11/2008 | Choi | B60R 21/2346 |
| | | | 280/728.2 |
| 2010/0090445 A1 | 4/2010 | Williams et al. | |
| 2012/0126515 A1 * | 5/2012 | Miyata | B60R 21/237 |
| | | | 280/730.1 |
| 2013/0001934 A1 | 1/2013 | Nagasawa et al. | |
| 2014/0361521 A1 | 12/2014 | Fukawatase | |
| 2015/0166002 A1 * | 6/2015 | Fukawatase | B60R 21/233 |
| | | | 280/730.1 |
| 2015/0258958 A1 * | 9/2015 | Belwafa | B60R 21/233 |
| | | | 280/729 |
| 2015/0258959 A1 * | 9/2015 | Belwafa | B60R 21/233 |
| | | | 280/729 |
| 2015/0343986 A1 * | 12/2015 | Schneider | B60R 21/205 |
| | | | 280/729 |
| 2016/0046257 A1 * | 2/2016 | Yamada | B60R 21/2338 |
| | | | 280/729 |

FOREIGN PATENT DOCUMENTS

| | | |
|---|---|---|
| CN | 1459394 A | 12/2003 |
| CN | 1824548 A | 8/2006 |
| CN | 1951732 A | 4/2007 |
| CN | 200985009 Y | 12/2007 |
| CN | 200985010 Y | 12/2007 |
| CN | 102849017 A | 6/2011 |
| CN | 102186702 A1 | 9/2011 |
| DE | 602 04 277 T2 | 11/2005 |
| DE | 10 2007 032 763 A1 | 1/2008 |
| DE | 10 2012 018 450 A1 | 3/2014 |
| EP | 1 364 838 A2 | 5/2003 |
| EP | 1 398 228 A2 | 3/2004 |
| EP | 1 498 320 A2 | 1/2005 |
| EP | 1 775 176 A1 | 4/2007 |
| EP | 1 775 177 A1 | 4/2007 |
| EP | 1 842 742 A2 | 10/2007 |
| EP | 1 693 256 B1 | 8/2008 |
| EP | 2 799 292 A1 | 11/2014 |
| JP | 56-67649 | 6/1981 |
| JP | 3-32956 | 2/1991 |
| JP | 4-55141 | 2/1992 |
| JP | 5-65706 | 8/1993 |
| JP | 6-72276 | 3/1994 |
| JP | 8-72661 | 3/1996 |
| JP | 8-2688204 | 10/1996 |
| JP | 10-71920 | 3/1998 |
| JP | 2000-280845 | 10/2000 |
| JP | 2003-182500 | 7/2003 |
| JP | 2003-335203 | 11/2003 |
| JP | 2004-262432 | 9/2004 |
| JP | 2005-88681 | 4/2005 |
| JP | 2005-247118 | 9/2005 |
| JP | 2006-88856 | 4/2006 |
| JP | 2006-256508 | 9/2006 |
| JP | 2006-327505 | 12/2006 |
| JP | 2007-112427 | 5/2007 |
| JP | 2007-112430 | 5/2007 |
| JP | 2007-216733 | 8/2007 |
| JP | 2007-276771 | 10/2007 |
| JP | 2008-44594 | 2/2008 |
| JP | 2008-114615 | 5/2008 |
| JP | 2008-179173 | 8/2008 |
| JP | 2009-227180 | 3/2009 |
| JP | 2009-120114 | 6/2009 |
| JP | 2010-201980 | 9/2010 |
| JP | 2010201980 A * | 9/2010 |
| JP | 2012-56371 | 3/2012 |
| JP | 2012-505783 | 3/2012 |
| JP | 2013-14176 | 1/2013 |
| JP | 2013-35473 | 2/2013 |
| JP | 2013-112276 | 6/2013 |
| JP | 2014-121965 | 7/2014 |
| KR | 2007-0042093 | 4/2007 |
| KR | 2007-0052192 | 5/2007 |
| KR | 2011-0071076 | 6/2011 |
| MX | 2007003946 A | 11/2008 |
| WO | WO 2010/045040 A1 | 10/2009 |
| WO | WO 2013/099036 A1 | 7/2013 |

OTHER PUBLICATIONS

Akito Urushibata, Air Bag and Air Bag Folding-Up Method, May 22, 2008, JPO, JP 2008-114615 A, Machine Translation of Description (Year: 2008).*

Iwamoto et al., Airbag and Airbag Device, Sep. 16, 2010, JPO, JP 2010-201980 A, English Abstract (Year: 2010).*

Iwamoto et al., Airbag and Airbag Device, Sep. 16, 2010, JPO, JP 2010-201980 A, Machine Translation of Description (Year: 2010).*

PCT International Search Report—dated Jun. 9, 2015.
PCT International Search Report—dated Apr. 7, 2015.
PCT International Search Report—dated Apr. 21, 2015.
PCT International Search Report—dated Oct. 6, 2015.

* cited by examiner (a)

(b)

(a)

(b)

(a)

(b)

(c)

AIRBAG DEVICE

CROSS REFERENCE TO RELATED APPLICATIONS

This application claims priority to Japanese Patent Application No. 2014-090942, filed on Apr. 25, 2014, and PCT/JP2015/050168, filed on Jan. 6, 2015.

FIELD OF THE INVENTION

The present invention relates to an airbag device that restrains an occupant of a front passenger seat in a vehicle from the front side of the vehicle.

BACKGROUND

In recent years, airbag devices have become standard equipment for most passenger motor vehicles. The airbag device is a safety device activated in the event of an emergency such as a vehicle collision and inflated and deployed by gas pressure for receiving and protecting an occupant. There are different kinds of airbag devices for various installation locations or uses. For example, a front airbag is provided in the center of the steering at the driver seat in order to protect the occupant of the front seat from an impact mainly in the front-back direction, and a passenger airbag is provided at the instrument panel or any of other locations in the vicinity of a front passenger seat. In addition, a curtain airbag that is inflated and deployed along the side windows is provided on the wall part near the ceiling in order to protect occupants of the front and back seats from a side collision and a subsequent roll over (turn over), and a side airbag that is inflated and deployed just beside an occupant is provided at a side of the seat.

As described above, the conventional front airbag and the passenger airbag are supposed to protect occupants from impacts mainly in the front-back direction of the vehicle. In recent years, however, a number of types of airbags adapted to cope with irregular collisions or impacts including a so-called oblique collision in which an impact is applied obliquely with respect to the front-back direction of a vehicle have been studied. For example, a front passenger seat airbag disclosed in Japanese Patent Application Publication No. JPH08-268204 is configured to also cover the vicinity of the center console in the center of the instrument panel. In an oblique collision, an occupant of a front passenger seat may be moved toward the center console positioned obliquely in front of the occupant, and therefore an airbag device adapted to be inflated and deployed in the vicinity of the center console is useful.

The cushion of the airbag device in Japanese Patent Application Publication No. JPH08-268204 however covers the center console and therefore has a shape that expands particularly inwardly in a vehicle-widthwise direction (to the inner side of the vehicle) from its storing location in the instrumental panel. The cushion in the shape expanded locally to the inner side of the vehicle tends to swing in the vehicle-widthwise direction because gas also tends to flow in the vehicle-widthwise direction therein, which may give rise to irregularities in deployment behavior. The airbag device must be quickly inflated and deployed in milliseconds toward target locations, and stable deployment behavior is required for the purpose.

The present invention is in view of the above-described problem, and it is an object of the present invention to provide an airbag device that can be inflated and deployed quickly with more stable deployment behavior.

SUMMARY AND INTRODUCTORY DESCRIPTION OF THE INVENTION

In order to solve the above-described problem, an exemplary airbag device according to the present invention is configured to restrain an occupant of a front seat in a vehicle from a front side of the vehicle and includes a housing having an opening openable at a prescribed surface and provided in a prescribed location in the vicinity of the front seat. A main bag is provided which is stored in the housing and inflated and deployed from the opening toward a front side of the front seat, and a support bag provided more inside in a vehicle-widthwise direction than the main bag and stored in the housing together with the main bag to be inflated and deployed from the opening toward a rear side of a center console. The main bag and the support bag each have a bag shape and are reduced in size and stored in the housing in a stored form such that the support bag is placed on the main bag on the opening side.

The airbag device according to this invention is provided with the main bag and the support bag as a cushion configured to be inflated and deployed for restraining a front passenger seat occupant. The main bag is a part that is inflated and deployed in front of the occupant, and the support bag is a part that is inflated and deployed in front of the center console on the inner side in the vehicle-widthwise direction as viewed from the occupant.

In accordance with this invention the main bag and the support bag are provided side by side in the vehicle-widthwise direction. They are stored in a compact form in the housing before use and inflated and deployed to a target range from the opening of the housing upon receiving gas. At the time, according to the invention, the support bag and the main bag are both reduced in size, and then the support bag is stored as the bag is placed on the main bag on the opening side. Note that the size reduction of the support bag or the like refers to reducing the volume of the bag-shaped support bag or the like by rolling, folding, compressing, or the like.

In the stored form as described above, the support bag swiftly comes out from the housing prior to the main bag without being interfered by the main bag. More specifically, in the above-described arrangement, gas can be supplied smoothly to the support bag, and inflation and deployment of the support bag completes prior to that of the main bag. In this way, the swinging of the support bag directed to the inner side of the vehicle caused by the inflation and deployment is canceled out by the following inflation and deployment of the main bag, so that the swinging of the cushion as a whole can be reduced. Therefore, in the above-described arrangement, the main bag and the support bag can be inflated and deployed quickly toward target locations with more stable deployment behavior.

In the stored form as described above, the main bag and the support bag are each folded or rolled to be reduced in size in an up-down direction or in a vehicle front-back direction, and then an end of the support bag opposite to the main bag may be folded back toward the support bag or the main bag on the opening side.

In the above-described arrangement, when the main bag and the support bag are reduced in size, these bags are folded in the up-down direction or in the vehicle front-back direction to start with. The folding or the like in the direction allows the main bag and the support bag provided side by side in the vehicle-widthwise direction to be reduced in size as the bags are formed into respective separated masses. The cushion is stored in the housing in a stored form such that the end of the support bag opposite to the main bag is folded back toward the support bag or the main bag on the opening side. In the stored form, the support bag can be efficiently positioned on the opening side of the housing.

In the above-described stored form, the end of the support bag opposite to the main bag may be folded back from a starting point on the support bag. Also in this arrangement, the stored form allows the support bag to be inflated and deployed prior to the main bag.

In the above-described stored form, the end of the support bag opposite to the main bag may be folded back from a starting point on the main bag. In the above-described stored form, the end of the support bag opposite to the main bag may be folded back from a boundary between the support bag and the main bag as a starting point. Also in this stored form, the support bag may be inflated and deployed prior to the main bag.

In the above-described stored form, an outer side end of the main bag in the vehicle-widthwise direction may be folded back toward the support bag from a starting point on the main bag without overlapping the end of the support bag opposite to the main bag. In this arrangement, the inflation and deployment with reduced interference between the main bag and the support bag can be achieved.

The main bag and the support bag described above may each be folded or rolled toward a center from an upper end and a lower end or from a front end and a rear end during folding or rolling for the size reduction. These manners of folding or the like allow the main bag and the support bag to be reduced in size as the bags are formed into respective separated masses.

In order to solve the above-described problem, another exemplary airbag device according to the present invention is configured to restrain an occupant of a front seat in a vehicle from a front side of the vehicle and includes a housing having an opening openable at a prescribed surface and provided in a prescribed location in the vicinity of the front seat, a main bag stored in the housing and inflated and deployed from the opening toward a front side of the front seat, and a support bag provided more inside in a vehicle-widthwise direction than the main bag and stored in the housing together with the main bag to be inflated and deployed from the opening toward a rear side of a center console, the main bag and the support bag each have a bag shape, and the support bag is reduced in size and stored in the housing beside the main bag on an inner side in the vehicle-widthwise direction.

In the above-described arrangement, the main bag and the support bag are reduced in size as respective masses and stored in the housing. Therefore, mutual interference between the main bag and the support bag can be suppressed during inflation and deployment. Since the support bag is stored separately from the main bag, the support bag can be smoothly supplied with gas. More specifically, in the process of inflation and deployment of the entire cushion, the support bag can be inflated and deployed earlier. In this way, the swinging of the support bag caused by the inflation and deployment can be canceled out by the inflation and deployment of the main bag subsequent to the inflation and deployment of the support bag, and therefore the swinging of the cushion as a whole can be reduced. Therefore, also in the above-described arrangement, the main bag and the support bag can be quickly inflated and deployed toward target locations with more stable deployment behavior.

The main bag and the support bag may each be folded or rolled to be reduced in size in the up-down direction or the vehicle front-back direction and then stored in the housing. The folding or the like in the direction allows the main bag and the support bag provided side by side in the vehicle-widthwise direction to be efficiently reduced in size as the bags are formed into respective separated masses.

The main bag and the support bag may each be folded or rolled toward a center from an upper end and a lower end or from a front end and a rear end during folding or rolling for the size reduction. These manners of folding or the like allow the main bag and the support bag to be reduced in size as the bags are formed into respective separated masses.

The housing may be provided inside an upper surface portion of the instrument panel with the opening facing the upper surface portion, and the main bag and the support bag may tear the upper surface portion to be inflated and deployed rearward in the vehicle. The front seat is preferably a front passenger seat. In this arrangement, the airbag cushion in the above-described stored form can be installed in the vehicle in a more efficient position.

According to the present invention, an airbag device that can be inflated and deployed quickly with more stable deployment behavior can be provided.

DETAILED DESCRIPTION

Figure 1:
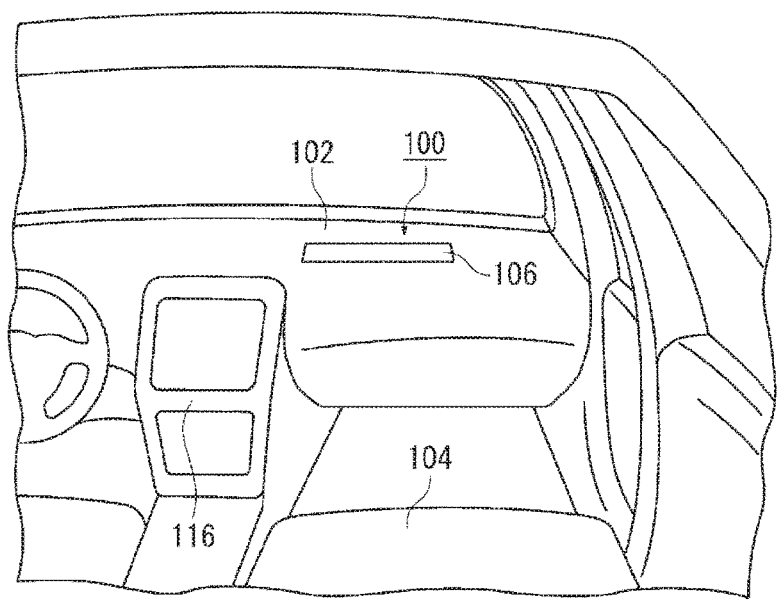
FIGS. 1(a) and (b) show a general structure of an airbag device according to an embodiment of the present invention.
Figure 1:
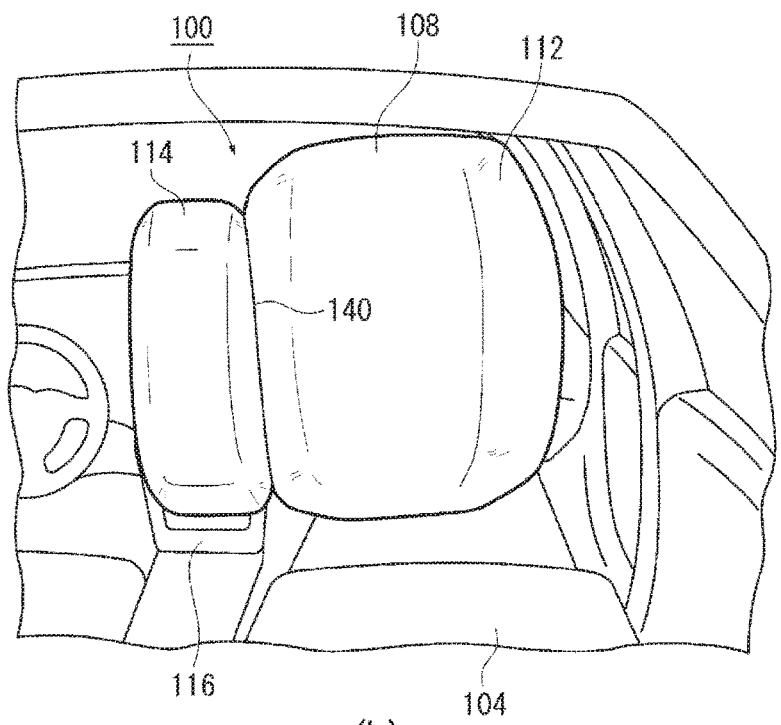

Now, a preferred embodiment of the present invention will be described with reference to the accompanying drawings. The sizes, materials, and other specific numerical values or the like in the following description of the embodiment are simply by way of illustration and for ease of understanding of the invention and should not be construed to limit the invention unless otherwise specified. Note that in the description and the drawings, elements having substantially identical functions and structures are designated by the same reference characters, and a repeated description of them will be omitted, while elements that are not directly relevant to the present invention are not shown.

FIGS. 1(a) and (b) show a general structure of an airbag device 100 according to the embodiment of the present invention. FIG. 1(a) is a view of a vehicle before the airbag device 100 is activated. According to the embodiment, the airbag device 100 is implemented as a front passenger seat airbag. The airbag device 100 is provided inside an upper surface portion 106 of an instrument panel 102 on the side of a front passenger seat 104.

Upon receiving an impact detection signal from a sensor (not shown), the airbag device 100 causes the cushion 108 (see FIG. 1(b)) to tear the upper surface portion 106 and to be inflated and deployed rearward in the vehicle. FIG. 1(b) is a view of the vehicle after the airbag device 100 is activated. The cushion 108 of the airbag device 100 restrains an occupant of the front passenger seat 104 from the front side of the vehicle. The cushion 108 has a bag shape and is inflated and deployed by gas supplied from an inflator 110 (see FIG. 2(a)). The cushion 108 is formed for example by sewing or adhering together pieces of base fabric placed on each other to form its surface or by weaving using a OPW (One-Piece Woven).

The cushion 108 of the airbag device 100 includes two parts, a main bag 112 and a support bag 114. The main bag 112 is a part with a larger capacity that is inflated and deployed in front of the occupant. The support bag 114 is a part with a smaller capacity than the main bag 112 and inflated and deployed more inside than the main bag 112 in the vehicle-widthwise direction. The support bag 114 is inflated and deployed in front of the center console 116 as viewed from the occupant and prevents the occupant from contacting the center console 116 for example in an oblique collision. The center console 116 is a portion of the instrument panel 102 in the center of the vehicle interior, and may protrude in a rearward direction in some vehicle interior designs.

Figure 2:
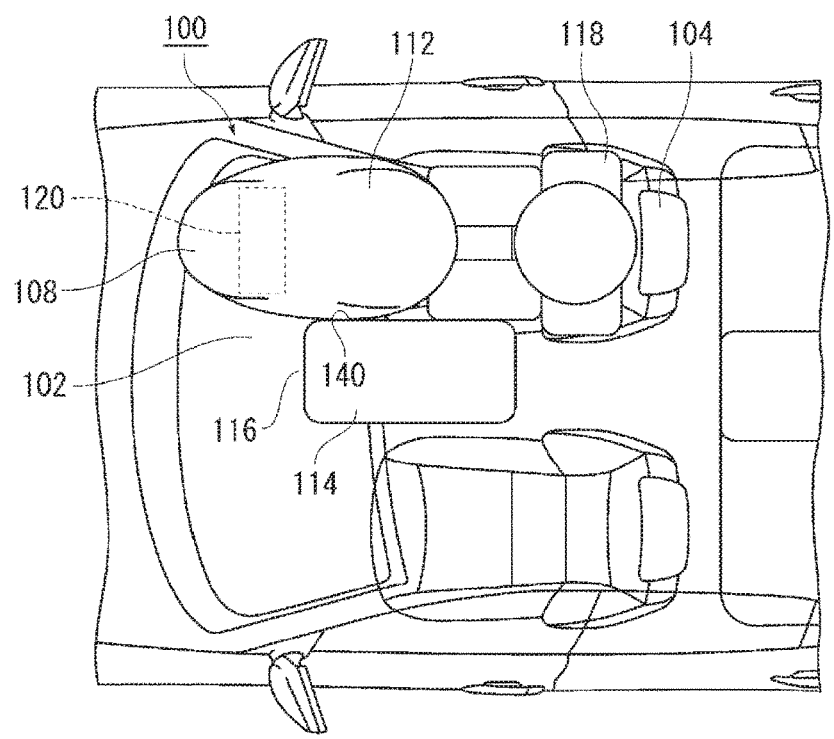
FIGS. 2(a) and (b) schematically show the airbag device in FIG. 1(b) after its activation in different directions.
Figure 2:
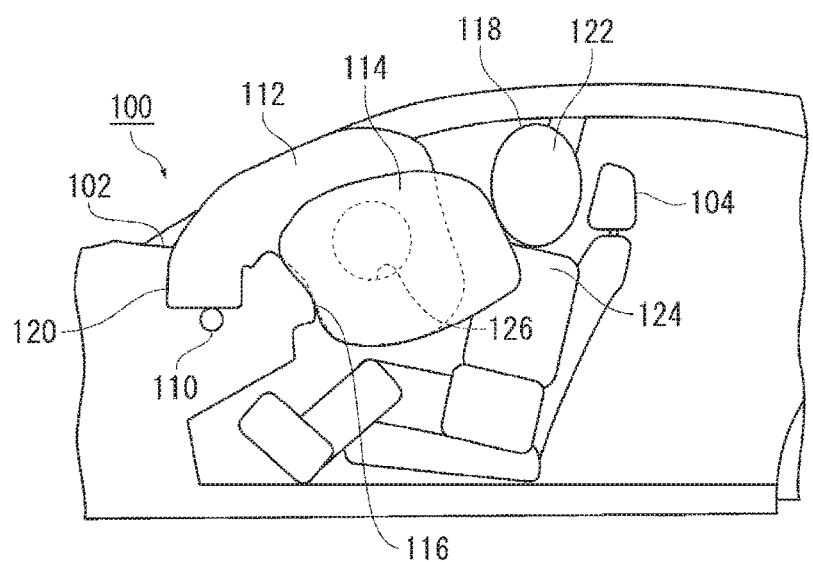

FIGS. 2(a) and (b) schematically show the activated airbag device 100 in FIG. 1(b) in different directions. FIG. 2(a) is a view of the airbag device 100 as viewed from above, and FIG. 2(b) is a view of the airbag device 100 as viewed from the inner side in the vehicle-widthwise direction. FIG. 2(a) and FIG. 2(b) schematically show an occupant 118 of a front passenger seat 104.

As shown in FIG. 2(a), according to the embodiment, a housing 120 that stores the cushion 108 is provided inside the instrument panel 102. The main bag 112 extends rearward in the vehicle from the housing 120 and is inflated and deployed on the front side of the front passenger seat 104, in other words, between the instrument panel 102 and the front passenger seat 104.

The support bag 114 is also stored together with the main bag 112 in the housing 120 and inflated and deployed behind the center console 116 and more inside than the main bag 112 in the vehicle-widthwise direction. Note that the instrument panel 102 is only an example of the location for providing the housing 120. The housing 120 may be provided in any other location near the front passenger seat 104 if the location allows the main bag 112 to be inflated and deployed in front of the occupant and the support bag 114 to be inflated and deployed behind the center console 116.

The support bag 114 protrudes beyond the main bag 112 in the rearward direction in the vehicle. As shown in FIG. 2(b), if the occupant 118 is in contact with the main bag 112, the support bag 114 restrains the vicinity of the temporal region 122 and the shoulder 124 of the occupant 118. In this way, in response to an impact caused in an oblique collision for example, the support bag 114 can prevent the occupant 118 not only from hitting the center console 116 but also from moving to the inner side of the vehicle.

The airbag device 100 has the inflator 110 provided for example at the bottom of the housing 120, and gas is supplied from the inflator 110 to the main bag 112. The support bag 114 according to the embodiment is connected with the main bag 112 by a large vent hole 126 and inflated and deployed by gas supplied from the main bag 112. Note that the vent hole 126 is not essential, and the main bag 112 and support bag 114 may be independent bags from each other. A single cushion as a whole may be divided inside into two and the part on the front side of the front passenger seat 104 may be used as a main bag and the part behind the center console may be used as a support bag.

Alternatively, in a different arrangement from the embodiment, for example a main bag and a support bag may be independent from each other and provided with separate housings and inflators. Furthermore, a main bag and a support bag that are independent from each other including separate inflators may be stored in the same housing. As compared to these arrangements, according to the embodiment, the main bag 112 and the support bag 114 are connected by the vent hole 126 and stored in the single housing 120, so that these bags can be inflated and deployed by the single inflator 110. The embodiment is advantageous in terms of reduction in the weight and cost as compared to the case of providing the main bag and the like independently.

Note that the support bag 114 does not have to protrude rearward beyond the main bag 112 in the vehicle. For example, when the amount of rearward protrusion of the support bag 114 in the vehicle is about the same as that of the main bag 112, the support bag 114 can prevent the occupant 118 from hitting the center console 116.

Figure 3:
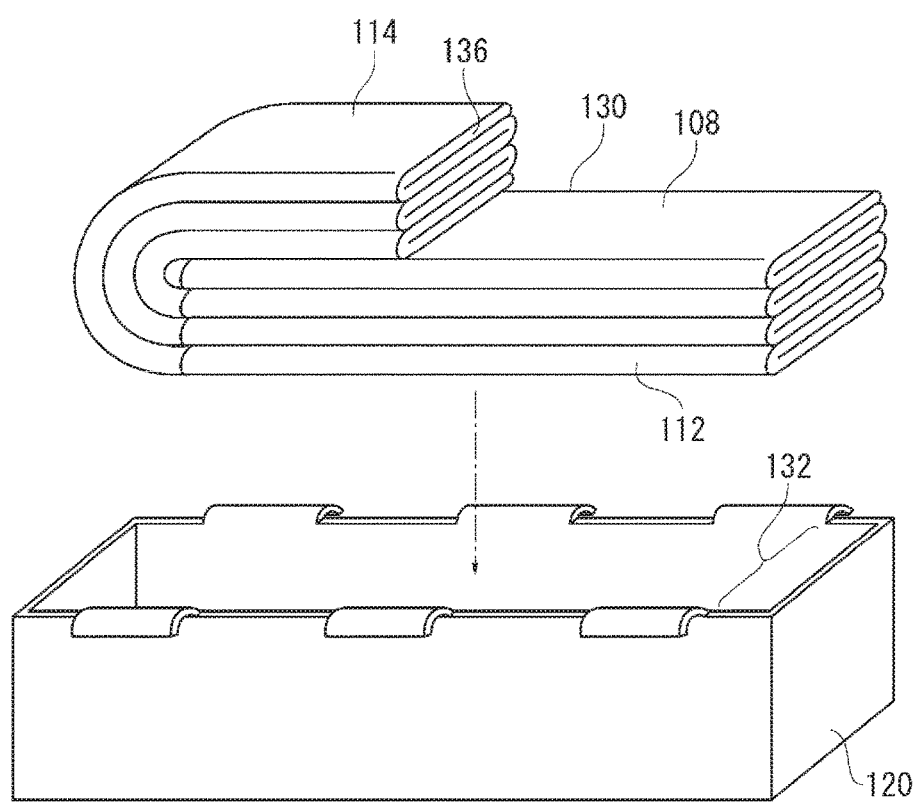
FIG. 3 is an exploded view of a housing and a cushion in the airbag device shown in FIG. 1(a) before its activation.

FIG. 3 is an exploded view of the housing 120 and the cushion 108 before the airbag device 100 in FIG. 1(a) is activated. The cushion 108 in a bag shape is folded into a small size in a stored form 130 and stored in the housing 120. The housing 120 is box-shaped and has its top side formed as an openable opening 132. The cushion 108 is inflated and deployed from the opening 132 toward a target range. The housing 120 that stores the cushion 108 is provided inside the upper surface portion 106 of the instrument panel 102 (see FIG. 1(a)) with the opening 132 facing the upper surface portion 106.

The stored form 130 according to the embodiment allows the cushion 108 to be quickly inflated and deployed with stable deployment behavior for its unique folding manner. More specifically, the cushion 108 in the stored form 130 is folded so that the support bag 114 is positioned above the main bag 112, in other words, on the side of the opening 132. The cushion 108 is stored in the housing 120 in the stored form 130, so that the inflation and deployment of the support bag 114 completes prior to that of the main bag 112.

Figure 4:
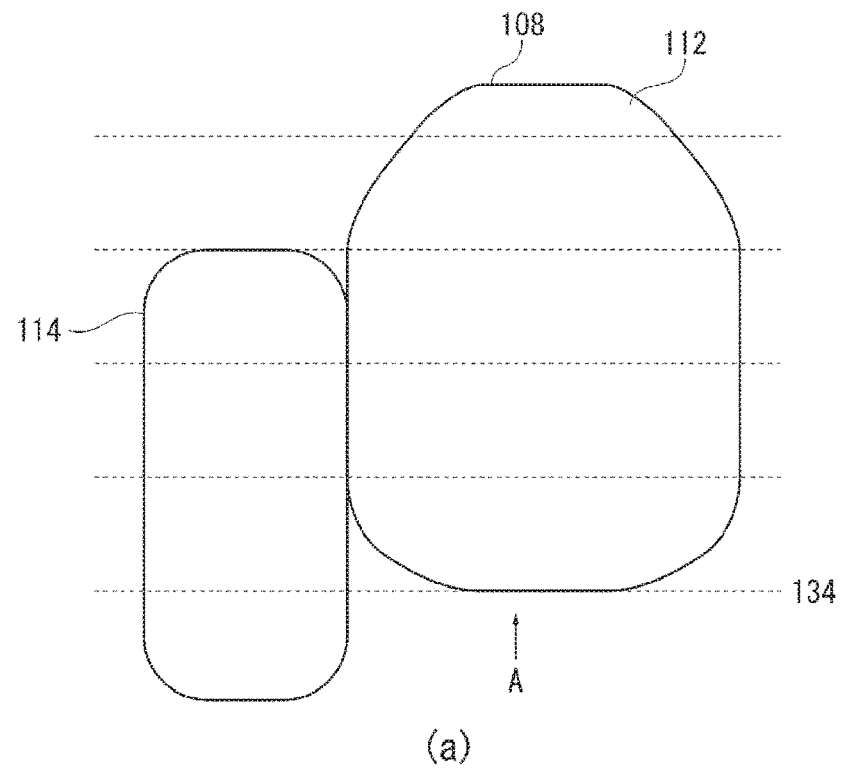
FIGS. 4(a), (b) and (c) show the process of folding the cushion in FIG. 3.
Figure 4:
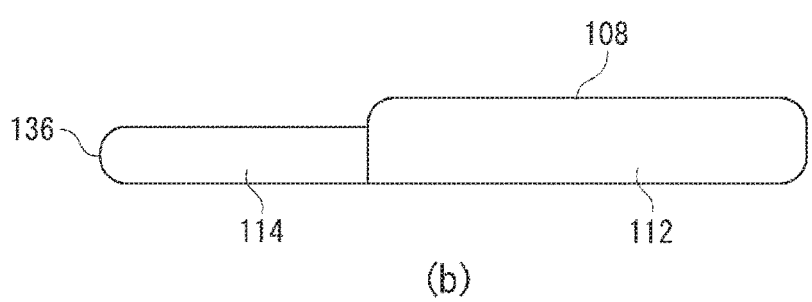
Figure 4:
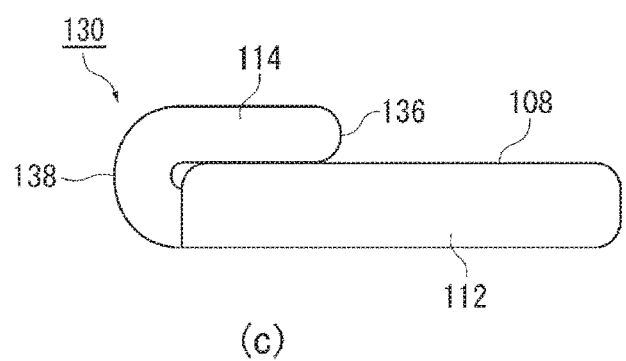

FIGS. 4(a) through (c) show the process of folding the cushion 108 in FIG. 3. FIG. 4(a) is a schematic view of the cushion 108 reduced in size in the up-down direction along its shape. The upper side in FIG. 4(a) roughly corresponds to the front side of the vehicle and the lower side roughly corresponds to the rear side of the vehicle. According to the embodiment, in the process of folding the cushion 108 into the stored form, the main bag 112 and the support bag 114 are first folded so that their sizes are reduced in the front-back direction of the vehicle. At the time, the bags are folded along folding lines denoted by a plurality of broken lines 134 that extend in the vehicle-widthwise direction. Note that the bags may be folded in the shape of bellows or in a rolling manner (rolled).

FIG. 4(b) is a view of the cushion 108 in FIG. 4(a) in a folded state when viewed from the rear side of the vehicle (in the direction of the arrow A). The main bag 112 and the support bag 114 according to the embodiment are provided side by side in the vehicle-widthwise direction. In FIG. 4(a), the main bag 112 and the support bag 114 are folded in the front-back direction of the vehicle. The folding or the like in the direction allows the main bag 112 and the support bag 114 provided side by side in the vehicle-widthwise direction to be reduced in size as the bags are formed into respective separated masses, so that the bags can be restrained from being inserted between each other or entangled with each other.

FIG. 4(c) is a view of the cushion 108 in FIG. 4(b) in a further folded state. As shown in FIG. 4(c), an end 136 of the support bag 114 on the opposite side to the main bag 112 is folded back over the main bag 112 from a starting point (starting point 138) on the support bag 114. In this way, the stored form 130 shown in FIG. 3 is obtained.

Referring back to FIG. 3, when the cushion 108 in the stored form 130 is stored in the housing 120, the support bag 114 is positioned on the side of the opening 132 of the housing 120. When the housing 120 is provided on the inner side of the upper surface portion 106 (see FIG. 1(a)), the cushion 108 is mounted to the vehicle while the main bag 112 is positioned adjacent to the upper surface portion 106.

According to the embodiment, in the process of inflating and deploying the cushion 108, the support bag 114 and the main bag 112 can be restrained from interfering with each other, so that the support bag 114 can be smoothly supplied with gas. The support bag 114 is positioned closer to the opening 132 than the main bag 112, so that the support bag 114 comes out of the housing 120 before the main bag 112 does. The support bag 114 has a smaller capacity than the main bag 112, and its inflation and deployment completes before that of the main bag 112 (see FIG. 1(b)). In this arrangement, swinging of the support bag 114 toward the inner side of the vehicle caused by the inflation and deployment can be canceled out by the inflation and deployment of the main bag 112 having a greater capacity that follows that of the support bag 114, so that the swinging of the cushion 108 as a whole can be reduced.

The coupling portion 140 between the support bag 114 and the main bag 112 has a large amount of base fabric and therefore tends to have a large weight. Therefore, the coupling portion 140 tends to be deployed slowly. However, the support bag 114 is positioned above the main bag 112, which allows gas to be easily entered, so that the coupling portion 140 is also deployed in an early stage. According to the embodiment, the heavy coupling portion 140 is allowed to be deployed earlier, so that the swinging of the coupling portion 140 caused during its deployment can be cancelled by the inflation and deployment of the main bag 112 as opposed to the case of deploying the coupling portion 140 later.

As in the foregoing, in the airbag device 100 according to the embodiment, the swinging of the cushion 108 as a whole that may be caused during inflation and deployment can be reduced, which stabilizes the deployment behavior, so that the main bag 112 and the support bag 114 can be quickly inflated and deployed toward their target locations.

FIGS. 5(a) through (f) show modifications of the manner of folding the cushion 108 in FIG. 4(b). In a stored form 200 in FIG. 5(a), the end 136 of the support bag 114 on the opposite side to the main bag 112 is folded back on the main bag 112 from a starting point 202 on the boundary between the support bag 114 and the main bag 112. In a stored form 210 in FIG. 5(b), the end 136 of the support bag 114 is folded back toward the main bag 112 from a starting point 214 on the main bag 112. Also in these arrangements, the stored forms can be achieved so that the support bag 114 can be positioned above the main bag 112, in other words, on the side of the opening 132 without being inserted between the main bag 112, and the support bag 114 can be inflated and deployed first.

Figure 5:
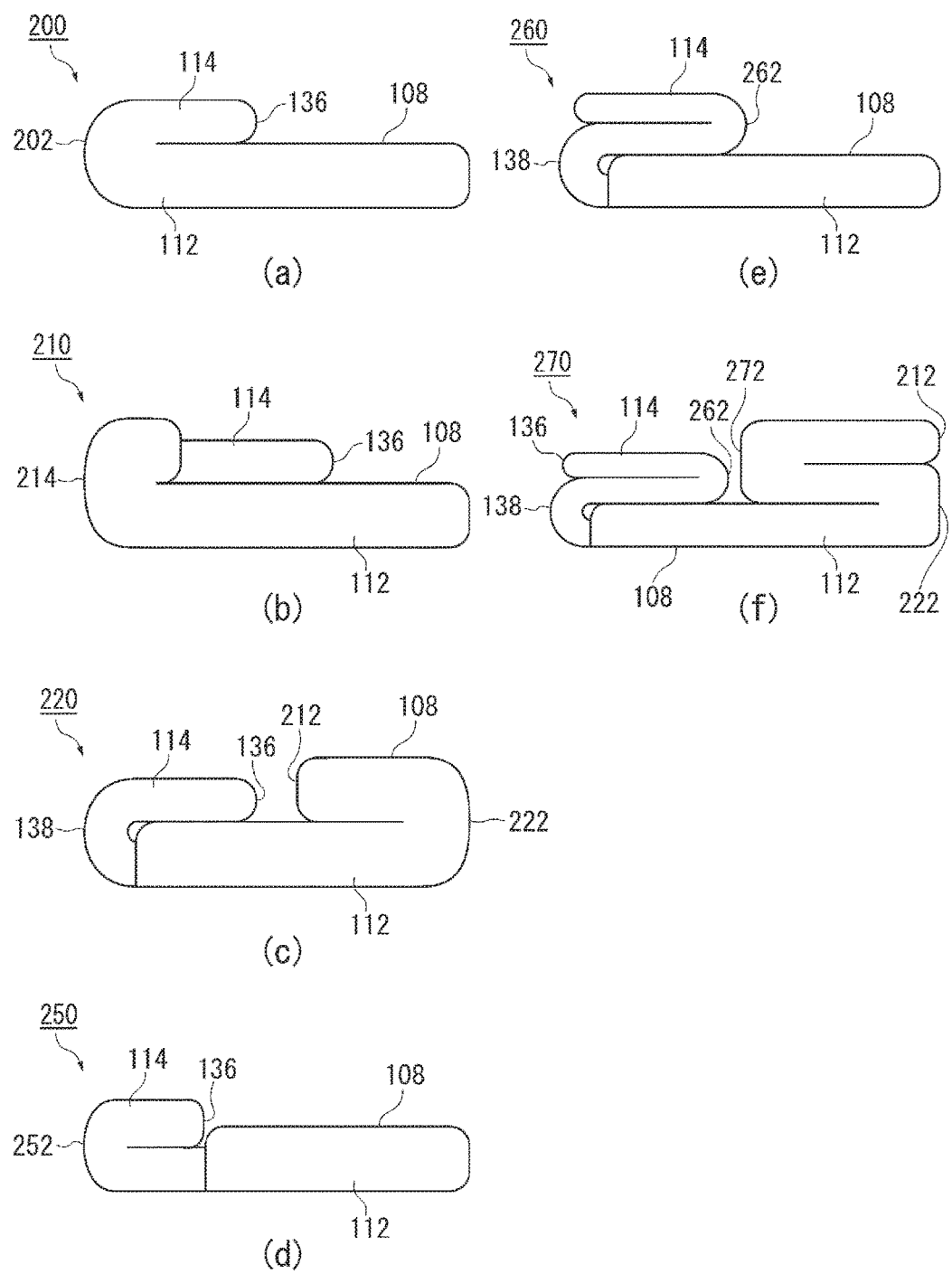
FIGS. 5(a) and (f) show various modifications of the manner of folding the cushion in FIG. 4(b).

In a stored form 220 in FIG. 5(c), an end 212 of the main bag 112 on the outer side in the vehicle-widthwise direction is folded back to the side of the support bag 114 from a starting point 222 on the main bag 112 without overlapping the end 136 of the support bag 114, and then the bags are stored in the housing 120. In this arrangement, the main bag 112 and the support bag 114 can be inflated and deployed with reduced interference with each other.

In a stored form 250 in FIG. 5(d), the end 136 of the support bag 114 is folded back on the support bag 114 (to the side of the opening 132 (see FIG. 3)) from a starting point 252 on the support bag. Also in the stored form 250, the support bag 114 and the main bag 112 can be stored in the housing 120 with reduced insertion between each other. Also in this arrangement, the support bag 114 having a smaller capacity can be smoothly inflated and deployed prior to the main bag 112. In this way, the folded end 136 of the support bag 114 may be placed on the support bag 114 or on the main bag 112 as in FIG. 4(c).

In a stored form 260 in FIG. 5(e), the end 136 of the support bag 114 is folded twice in total in two locations, a starting point 138 and a second starting point 262 on the support bag. Also in the stored form 260, the bags may be stored in the housing 120 while the support bag 114 is positioned closer to the opening 132 (see FIG. 3) than the main bag 112. In this way, the support bag 114 may be folded twice or more if the main bag 112 is not inserted therebetween.

In a stored form 270 in FIG. 5(f), the end 212 of the main bag 112 is also folded twice in total in two locations, a starting point 222 and a second starting point 272 on the main bag. In this way, the main bag 112 can also be folded twice or more if the support bag 114 is not inserted therebetween.

Figure 6:
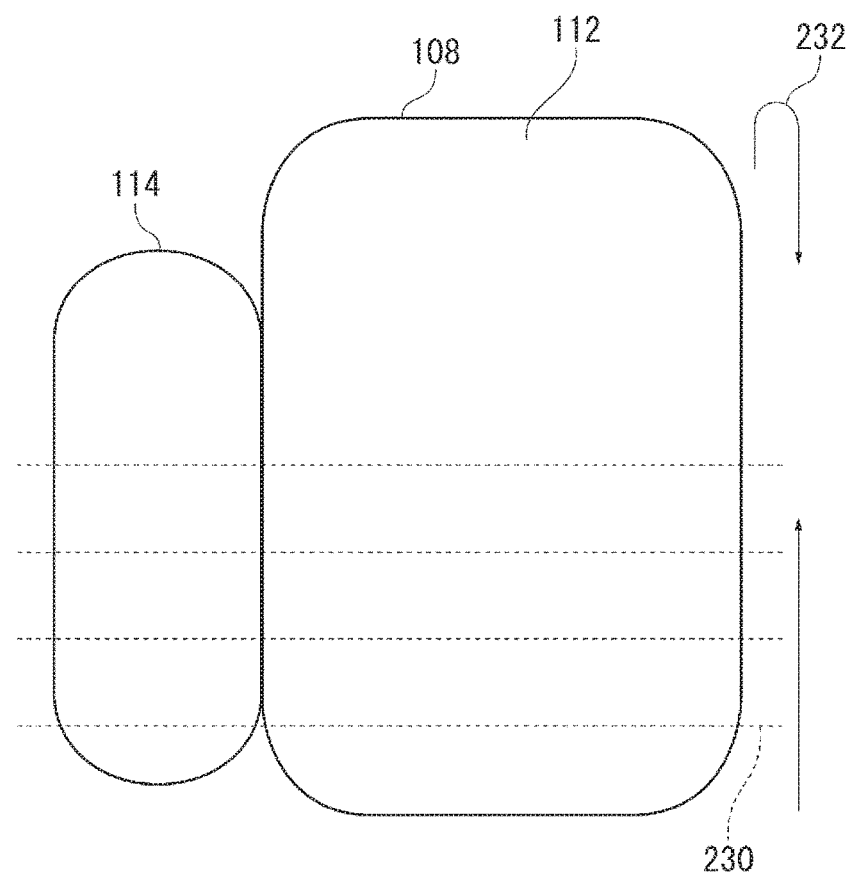
FIG. 6 is a view of a modification of the manner of folding the cushion in FIG. 4(a).

FIG. 6 is a view of a modification of the manner of folding the cushion 108 in FIG. 4(a). FIG. 6 is a schematic view of the cushion 108 made into a compact form along to the shape in the front-back direction. In the up-down direction in FIG. 6 roughly corresponds to the up-down direction of the cushion 108 when viewed from the occupant. In the process of folding the cushion 108 into each of the stored forms, the cushion 108 can be folded and reduced in size not only in the front-back direction of the vehicle (see FIG. 4(a)) but also in the up-down direction.

The cushion 108 can be rolled in addition to being folded. For example, the lower part of the cushion 108 is folded along a folding line indicated by the broken line 230 from the lower end to the center, and the upper part of the cushion 108 may be rolled from the upper end to the center as indicated by the arrow 232. In this way, the cushion 108 can be folded or rolled from the upper and the lower end or from the front end and the rear end in the front-back direction of the vehicle toward the center and reduced into a stored form. Note that the cushion 108 may be rolled so that the axis of rolling extends in the vehicle-widthwise direction, and the main bag 112 and the support bag 114 can be rolled without being entangled between each other.

Figure 7:
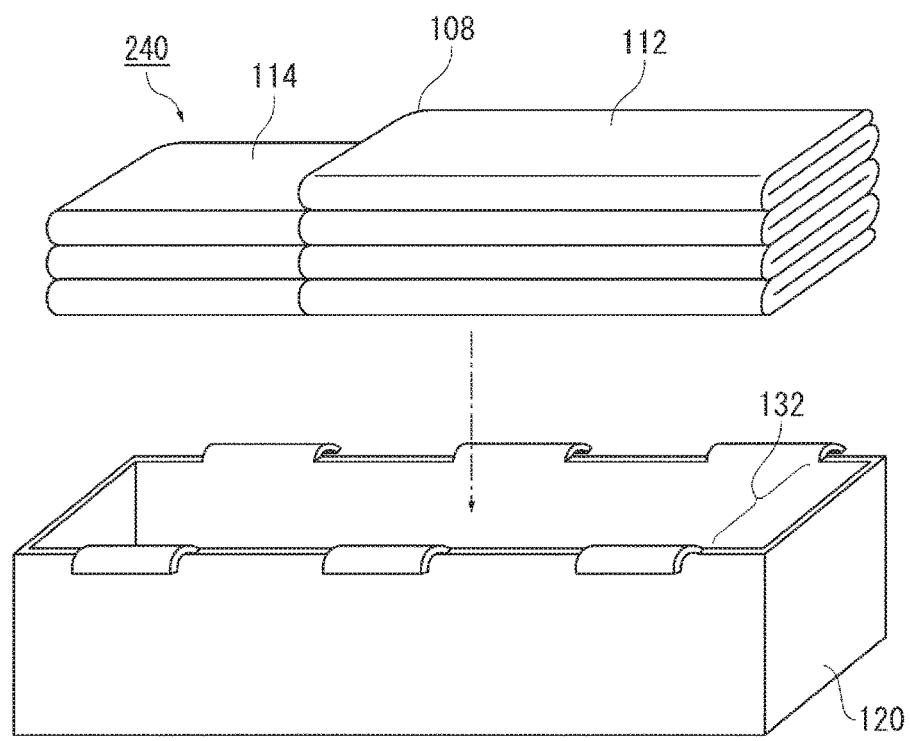
FIG. 7 is an exploded view of a modification of the manner of folding the cushion in FIG. 3.

FIG. 7 is an exploded view of a modification of the manner of folding the cushion 108 in FIG. 3. As described above, if the cushion 108 folded and reduced into a stored form 240 in the up-down direction or the vehicle front-back direction can be still stored in the housing 120 without changing its length in the vehicle-widthwise direction, the operation of folding back of the support bag 114 and the main bag 112 described in conjunction with FIGS. 4(a)-(c) and FIGS. 5(a)-(f) may be omitted. In the stored form 240 in which the cushion 108 is folded in the up-down direction or the vehicle front-back direction, the support bag 114 is stored in the housing 120 without being overlapped on the main bag 112 in the up-down direction or the vehicle front-back direction. Therefore, in the housing 120, the support bag 114 is stored on the inner side of the vehicle, and the main bag 112 is stored on the outer side of the vehicle as respective separated masses.

Also in the stored form 240, the main bag 112 and the support bag 114 can be reduced in size with reduced insertion or entanglement between each other. In particular, the support bag 114 is stored beside the main bag 112 on the inner side in the vehicle-widthwise direction separately from the main bag 112. Therefore, the support bag 114 can be prevented from interfering with the main bag 112 during inflation and deployment, so that gas can be smoothly supplied. The support bag 114 having a smaller capacity than the main bag 112 is inflated and deployed earlier than the main bag 112. In this arrangement, the swinging of the support bag 114 caused by the inflation and deployment can be canceled out by the inflation and deployment of the main bag 112 having a greater capacity that follows that of the support bag 114, and therefore the swinging of the cushion 108 as a whole can be reduced. Therefore, also in the stored form 240, the main bag 112 and the support bag 114 can be inflated and deployed swiftly toward target locations with stable deployment behavior.

In the foregoing, the cushion 108 including the main bag 112 and the support bag 114 is made into a compact size by rolling or folding. However, the method of reducing the size of the cushion 108 is not limited to the above, and for example the cushion 108 may be deflated for reducing the entire form. Even when the main bag 112 and the support bag 114 are compressed in this manner and formed into respective masses, the support bag 114 may be placed on the main bag 112 on the side of the opening 132 as in FIG. 3 or other figures or the support bag 114 may be stored beside the main bag 112 on the inner side of the vehicle as shown in FIG. 7. More specifically, the size reduction of the main bag 112 and the support bag 114 refers to reducing the volume of the bag-shaped cushion 108 by rolling, folding, compressing, or the like.

Although the preferred embodiment of the present invention has been described with reference to the accompanying drawings, the same is a preferable example of the invention, and other embodiments can be carried out or implemented in various other ways. The invention is not limited by details of the shapes, sizes, arrangements, and the like of the components shown in the accompanying drawings unless otherwise specified herein. The expressions and terms herein are used for the purpose of description and should not be taken as limiting unless otherwise specified.

Therefore, various modifications and variations that fall within the scope of the claims will be apparent to a person skilled in the art and it should be understood that those belong to the technical scope of the present invention.

While the above description constitutes the preferred embodiment of the present invention, it will be appreciated that the invention is susceptible to modification, variation and change without departing from the proper scope and fair meaning of the accompanying claims.

The invention claimed is:

1. An airbag device configured to restrain an occupant of a front seat in a vehicle from a front side of the vehicle, comprising:
   a housing having an opening openable at a prescribed surface and provided in a prescribed location in a vicinity of the front seat;
   a main bag stored in the housing and inflated and deployed from the opening toward a front side of the front seat; and
   a support bag provided more inside in a vehicle-widthwise direction than the main bag and stored in the housing together with the main bag to be inflated and deployed from the opening toward a rear side of a center console,
   wherein the main bag and the support bag each are reduced in size and stored in the housing in a stored form as the main bag and the support bag are formed into respective separated masses,
   wherein the support bag is positioned closer to an opening side than the main bag for deploying the support bag before the main bag when the airbag is deployed, and
   wherein a coupling portion between the main bag and the support bag is configured to deploy before the main bag when the airbag is deployed.

2. The airbag device according to claim 1, further comprising wherein in the stored form, the main bag and the support bag are each folded or rolled to be reduced in size in an up-down direction or in a vehicle front-back direction, and then an end of the support bag opposite to the main bag is folded back on the support bag or the main bag on the opening side.

3. The airbag device according to claim 2, further comprising wherein in the stored form, the end of the support bag opposite to the main bag is folded back from a starting point on the support bag.

4. The airbag device according to claim 2, further comprising wherein in the stored form, the end of the support bag opposite to the main bag is folded back from a starting point on the main bag.

5. The airbag device according to claim 2, further comprising wherein in the stored form, the end of the support bag opposite to the main bag is folded back from a starting point on a boundary between the support bag and the main bag.

6. The airbag device according to claim 2 further comprising wherein in the stored form, an outer side end of the main bag in the vehicle-widthwise direction is folded back toward the support bag from a starting point on the main bag without overlapping the end of the support bag opposite to the main bag.

7. The airbag device according to claim 2 further comprising wherein the main bag and the support bag are each folded or rolled toward a center from an upper end and a lower end or from a front end and a rear end during folding or rolling for the size reduction.

8. The airbag device according to claim 1 further comprising wherein the housing is provided inside an upper surface portion of the instrument panel with the opening facing the upper surface portion, and the main bag and the support bag tear the upper surface portion to be inflated and deployed rearward in the vehicle.

9. The airbag device according to claim 1 further comprising wherein the front seat is a front passenger seat.

10. The airbag device according to claim 1, further comprising wherein the center console is positioned near a vehicle-widthwise center of the vehicle and is offset from the vehicle-widthwise lateral position of the front seat.

11. An airbag device configured to restrain an occupant of a front seat in a vehicle from a front side of the vehicle, comprising:
   a housing having an opening openable at a prescribed surface and provided in a prescribed location in a vicinity of the front seat;

a main bag stored in the housing and inflated and deployed from the opening toward a front side of the front seat;

a support bag provided more inside in a vehicle-widthwise direction than the main bag and stored in the housing together with the main bag to be inflated and deployed from the opening toward a rear side of a center console; and a coupling portion formed between the main bag and the support bag, wherein the main bag and the support bag each are stored in the housing as respective separated masses, and the support bag is reduced in size and stored in the housing beside the main bag on an inner side in the vehicle-widthwise direction, and wherein the support bag with the coupling portion is deployed earlier than the main bag when the airbag is deployed because the support bag has a smaller capacity than the main bag.

12. The airbag device according to claim 11, further comprising wherein the main bag and the support bag are each folded or rolled to be reduced in size in an up-down direction or a vehicle front-back direction and then stored in the housing.

13. The airbag device according to claim 12, further comprising wherein the main bag and the support bag are each folded or rolled toward a center from an upper end and a lower end or from a front end and a rear end during folding or rolling for the size reduction.

14. The airbag device according to claim 11, further comprising wherein the housing is provided inside an upper surface portion of the instrument panel with the opening facing the upper surface portion, and the main bag and the support bag tear the upper surface portion to be inflated and deployed rearward in the vehicle.

15. The airbag device according to claim 11 further comprising wherein the front seat is a front passenger seat.

16. The airbag device according to claim 11, further comprising wherein the center console is positioned near a vehicle-widthwise center of the vehicle and is offset from the vehicle-widthwise lateral position of the front seat.

17. An airbag device configured to restrain an occupant of a front seat in a vehicle from a front side of the vehicle, comprising:

a housing having an opening openable at a prescribed surface and provided in a prescribed location in a vicinity of the front seat;

a main bag stored in the housing and inflated and deployed from the opening toward a front side of the front seat; and a support bag provided more inside in a vehicle-widthwise direction than the main bag and stored in the housing together with the main bag to be inflated and deployed from the opening toward a rear side of a center console, wherein the support bag protrudes beyond the main bag in a rearward direction in the vehicle when the airbag is deployed, wherein the main bag and the support bag each are reduced in size and stored in the housing in a stored form such that the support bag is placed on the main bag on an opening side, and wherein a coupling portion between the main bag and the support bag is configured to deploy before the main bag when the airbag is deployed.

18. The airbag device according to claim 17, further comprising wherein in the stored form, the main bag and the support bag are each folded or rolled to be reduced in size in an up-down direction or in a vehicle front-back direction, and then an end of the support bag opposite to the main bag is folded back on the support bag or the main bag on the opening side.

* * * * *